United States Patent
Chandrasekaran et al.

(10) Patent No.: US 11,831,490 B1
(45) Date of Patent: Nov. 28, 2023

(54) SYSTEMS, METHODS, AND MEDIA FOR PERFORMING INFORMATION TECHNOLOGY SERVICE MANAGEMENT CORRELATION FOR INFRASTRUCTURE ENVIRONMENT FUNCTIONS

(71) Applicant: FMR LLC, Boston, MA (US)

(72) Inventors: Devi Chandrasekaran, Chennai (IN); Sachin Samuel, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/190,320

(22) Filed: Mar. 27, 2023

(51) Int. Cl.
 *H04L 41/0663* (2022.01)
 *H04L 41/0631* (2022.01)

(52) U.S. Cl.
 CPC ........ *H04L 41/0663* (2013.01); *H04L 41/064* (2013.01)

(58) Field of Classification Search
 None
 See application file for complete search history.

(56) References Cited

U.S. PATENT DOCUMENTS

| | | | | |
|---|---|---|---|---|
| 11,204,824 | B1* | 12/2021 | Tiwari | G06F 11/0793 |
| 11,595,243 | B1* | 2/2023 | Schreiber | H04L 41/0816 |
| 2017/0178038 | A1* | 6/2017 | Guven | G06Q 30/016 |
| 2017/0302553 | A1* | 10/2017 | Zafer | H04L 41/142 |
| 2020/0259701 | A1* | 8/2020 | Povoa | G06F 11/0751 |
| 2021/0294681 | A1* | 9/2021 | Jasionowski | G06N 20/00 |
| 2022/0012602 | A1* | 1/2022 | Kataria | G06F 11/0751 |

* cited by examiner

*Primary Examiner* — Mohamed Ibrahim
(74) *Attorney, Agent, or Firm* — Cesari and McKenna, LLP (57) ABSTRACT

Techniques are provided for performing information technology service management (ITSM) correlation for infrastructure environment functions such as management, operation, and remediation. Specifically, a processor may receive an incident identifier for an incident record corresponding to an incident encountered by the infrastructure environment. The processor may use the incident identifier to correlate incident data to data of different management services, e.g., change management and problem management. Specifically, the processor may correlate the incident data to change data, and the change data may be correlated to problem data. The processor may also correlate the incident data to other incident data, and the other incident data may be correlated to problem data. The problem data can be utilized to improve or remediate the incident of interest.

20 Claims, 5 Drawing Sheets

SYSTEMS, METHODS, AND MEDIA FOR PERFORMING INFORMATION TECHNOLOGY SERVICE MANAGEMENT CORRELATION FOR INFRASTRUCTURE ENVIRONMENT FUNCTIONS

BACKGROUND

Technical Field

The present disclosure relates generally to information technology service management (ITSM), and more specifically to techniques for ITSM correlation for infrastructure environment functions such as management, operation, and remediation.

Background Information

As the complexity of information technology (IT) systems increases, resources needed for the management of those systems, such as equipment, etc. also increase. In addition to technical complexity and number of components, many organizations are providing additional demands on IT services to provide certain levels of data quality, dependability, cost effectiveness, return on investment, throughput, response time, etc. Furthermore, many large organizations may have more than one IT department with partially overlapping and possibly ill-defined areas of responsibility and interface constraints between the IT departments. The management challenges become even more acute when factoring in the difficulties associated with security, adding new components, and modifying existing components to meet user needs.

A configuration management database (CMDB) is an information technology infrastructure library (ITIL) database used by an organization to store information about hardware and software assets, which are often referred to as configuration items (CIs). A CI is a service component, infrastructure element, or other item that needs to be managed to ensure delivery of IT services. Examples of CI types include, but are not limited to, hardware/devices, software/applications, communications/networks, and storage components.

Because the IT services of an organization must ultimately meet the demands of customers and users of the IT services, customers and users are the entry point to the process model for IT services. Accordingly, customers and users may become involved in the process of service support by requesting changes and/or updates to the IT services to address certain problems and/or needs. Implementing such changes and/or updates requires the person who is responsible for implementation to define what services depend on the CI that is to be changed or updated. Additionally, implementing such changes and/or updates may initiate a chain of processes that includes: 1) incident management, 2) problem management, 3) change management, 4) release management, and 5) configuration management. The chain of processes is tracked using the CMDB, which contains the details of the CIs in the IT infrastructure and their relationships to each other. The category of functions that are supported by a CMDB is commonly known as IT Service Management (ITSM).

In many instances, the incident management process provides the most immediate and visible gains to IT service quality and cost reduction. The problem management process can be used to find the root cause of incident(s) so that similar incidents can be avoided in the future. To alleviate the root cause, one or more of change, configuration, and release management processes can be implemented.

As part of the incident management process, an incident ticket can be generated and provided, along with relevant information, to an IT service department of the organization. IT service personnel may try to resolve the incident through his/her expertise. With conventional approaches, the process of incident resolution is largely a manual process. Specifically, and with conventional approaches, the IT service personnel may be required to manually identify the CIs that are responsible for the incident. IT service personnel may also be required to manually correlate incident information with the infrastructure information from other management processes, e.g., problem management, change management, such that the incident can be resolved. This manual incident resolution process based on conventional techniques is inefficient, time consuming, error prone, and also requires a great level of understanding regarding each of the different management processes.

SUMMARY

Techniques are provided for performing information technology service management (ITSM) correlation for infrastructure environment functions. Specifically, and as will be described in further detail below, an incident identifier corresponding to an incident encountered by the infrastructure environment may be received. The incident identifier may be correlated to data of different management services, e.g., change management and problem management, to identify information that can be used to automatically improve or remediate the incident.

In an embodiment, a processor, e.g., an ITSM module executed by the processor, may receive an incident identifier corresponding to an incident of interest that affected a configuration item (CI) of interest. The processor may use incident data, determined from an incident data structure using the incident identifier, to query a change data structure that tracks changes that are implemented or that are to be implemented to the infrastructure environment. Based on the query, the processor may identify recent infrastructure environment changes that affected the CI of interest.

The processor may determine a set, e.g., 5, of previous infrastructure environment changes that are substantially similar to a selected infrastructure environment change. The set of previous infrastructure environment changes may each cause one or more incidents. The processor may use the set of previous infrastructure environment changes to query a problem data structure that tracks the problems that are encountered by the infrastructure environment and that lead to one or more incidents. Based on the query of the problem data structure, the processor may identify one or more problem records that include root cause information. The processor may use the root cause information to implement, e.g., automatically implement, an action that improves or remediates the incident of interest.

In an embodiment, the processor may also use the incident data to identify other incidents from the incident data structure. The other incidents may have occurred over a recent time period (e.g., 60 hours) and also affected the CI of interest. The other incident that are identified may be referred to as symptoms that are encountered by the infrastructure environment and that affect the CI of interest. The processor may determine a set of previous infrastructure environment symptoms, e.g., set of previous incidents, that are substantially similar to a selected symptom, e.g., an incident identifier of a selected other incident. The processor may use the set of previous incidents to identify one or more problem records from the problem data structure. The processor may use the identified problem records to automatically improve or remediate the incident of interest.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
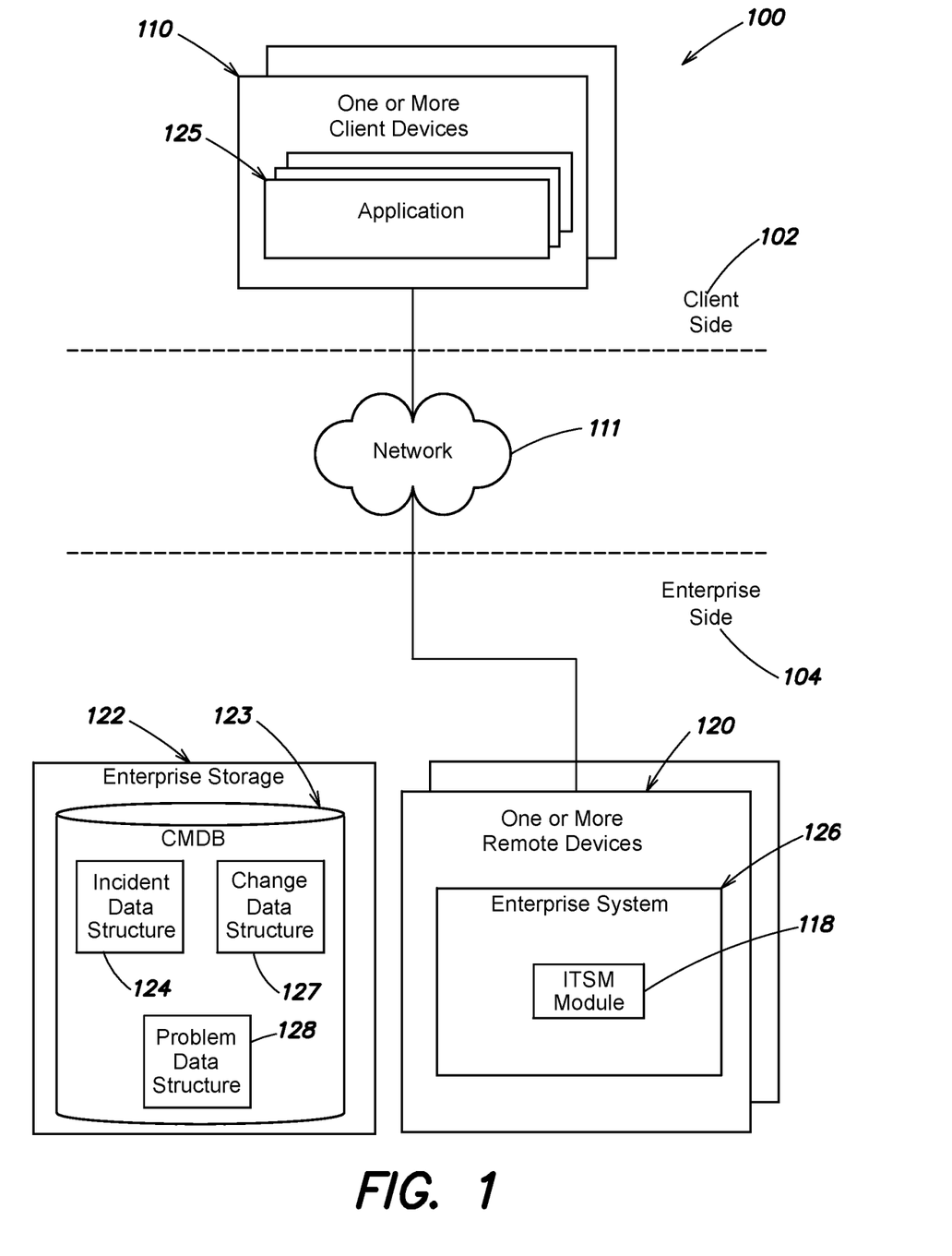
FIG. 1 is a high-level block diagram of an example architecture for performing information technology service management (ITSM) correlation for infrastructure environment functions according to one or more embodiments as described herein.

FIG. 1 is a high-level block diagram of an example architecture 100 for performing information technology service management (ITSM) correlation for infrastructure environment functions according to one or more embodiments as described herein. The architecture 100 may be divided into a client side 102 that includes one or more local client devices 110 that are local to end users, and an enterprise side 104 that includes one or more remote devices 120 and enterprise storage 122 that are remote from the end users.

In an embodiment, the one or more remote devices 120, of the enterprise side 104, may be one or more cloud-based devices and/or one or more server devices. The one or more remote devices 120 may store and execute enterprise system 126 that may implement the one or more embodiments as described herein. In an embodiment, the enterprise system 126 may be referred to as an infrastructure environment that includes hardware and software assets, which are often referred to as configuration items (CIs). A CI is a service component, infrastructure element, or other item that needs to be managed to ensure delivery of IT services. Examples of CI types include, but are not limited to, hardware/devices, software/applications, communications/networks, and storage components.

Enterprise system 126 may be managed, operated, and maintained by an enterprise. In an embodiment, the enterprise may be a financial services institution. In an implementation, the enterprise system 126 is an application, i.e., software. The enterprise system 126 may be accessible to its customers and/or authorized personnel, e.g., employees, of the enterprise. The enterprise system 126 includes ITSM module 118 that may implement the one or more embodiments as described herein. In an embodiment, only authorized personnel of the enterprise can execute the ITSM module 118 to implement the one or more embodiments as described herein.

The enterprise storage 122 includes Configuration Management Database (CMDB) 123. The CMDB 123 may include incident data structure 124, change data structure 127, and problem data structure 128. Each of incident data structure 124, change data structure 127, and problem data structure 128 may be a database, e.g., table. For example, each of incident data structure 124, change data structure 127, and problem data structure 128 may be a relational database.

The incident data structure 123 may store incident records including incident information relating to incidents encountered by an IT service of the enterprise system 126. In an embodiment, an incident causes (1) an interruption to an IT service provided by an infrastructure environment, (2) a reduction in quality of the IT service, or (3) change risk assessment on the information technology service. The change data structure 127 may store change records including change information relating to changes made to or changes planned for the enterprise system 126. Problem data structure 128 may store problem records including problem information relating to causes or potential causes that lead to one or more incidents. For example, the problem data structure 128 may store root cause information indicating what caused one or more incidents.

Enterprise storage 122 may also include other storage that may store any other data that is generated and/or obtained according to the one or more embodiments as described herein. In an implementation, the other storage of enterprise storage 122 may be a database (e.g., relational database), persistent storage, etc.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. For example, the client device 110 may download and execute application 125 that is provided by the enterprise. The execution of application 125 may allow customers of the enterprise to implement one or more financial services functions.

Client device 110 may also be operated by authorized personnel, e.g., IT service personnel, of the enterprise. For example, and as will be described in further detail below, IT service personnel may utilize client device 110 to execute ITSM module 118 to initiate the implementation of the one or more embodiments as described herein. Specifically, authorized personnel may utilize client device 110 to initiate the ITSM correlation to assist in remediating one or more issues, e.g., IT services issues, encountered by enterprise system 126 as will be described in further detail below.

Each computing device, e.g., one or more local client devices 110, one or more remote devices 120, and enterprise storage 122, may include processors, memory/storage, a display screen, and/or other hardware (not shown) for executing software, storing data, and/or displaying information.

As will be described in further detail below with reference to FIG. 2, the ITSM module 118 may receive an incident identifier, corresponding to an incident associated with a CI, to automatically query the change data structure 127 to determine changes implemented to the CI over a predefined time range, e.g., a recent time period. The determined changes can be used to more efficiently and accurately determine which changes may have caused the incident. The ITSM module 118 may utilize a change identifier corresponding to a determined change, as will be described in further detail below with reference to FIG. 3, to identify similar previous changes in the change data structure 127. The ITSM module 118 may utilize the similar previous changes to query the problem data structure 128 to identify root cause information. The root cause information can be utilized to implement, e.g., automatically implement, one or more actions to improve or remediate the incident.

Therefore, the incident data is correlated to the change data as described in further detail below with reference to FIG. 2. That is, incident data of the incident data structure 124 can be leveraged to automatically identify the most recent changes (e.g., change records) from the change data structure 127 that are related to a CI, e.g., a CI of interest, that is affected by the incident. Further, the change data is correlated to the problem data as described in further detail below with reference to FIG. 3. That is, the change data of the change data structure 127 can be leveraged to automatically identify the problem data (e.g., problem records of the problem data structure 128) with root cause information that can be used to remediate the incident that affected the CI of interest. As such, the change data of the change data structure 127 is correlated to the problem data of the problem data structure 128 based on the implementation of the procedures of FIGS. 2 and 3.

Such correlations, as will be described in further detail below, allow for better and more efficient operation, management, and remediation of an infrastructure environment when compared to conventional approaches. Advantageously, IT incidents can be avoided and/or remediated more efficiently when compared to conventional approaches. This in turn results in better IT services for the users of enterprise system 126. As such, the one or more embodiments as described herein provide an improvement in the existing technological field of information technology service management.

Figure 2:
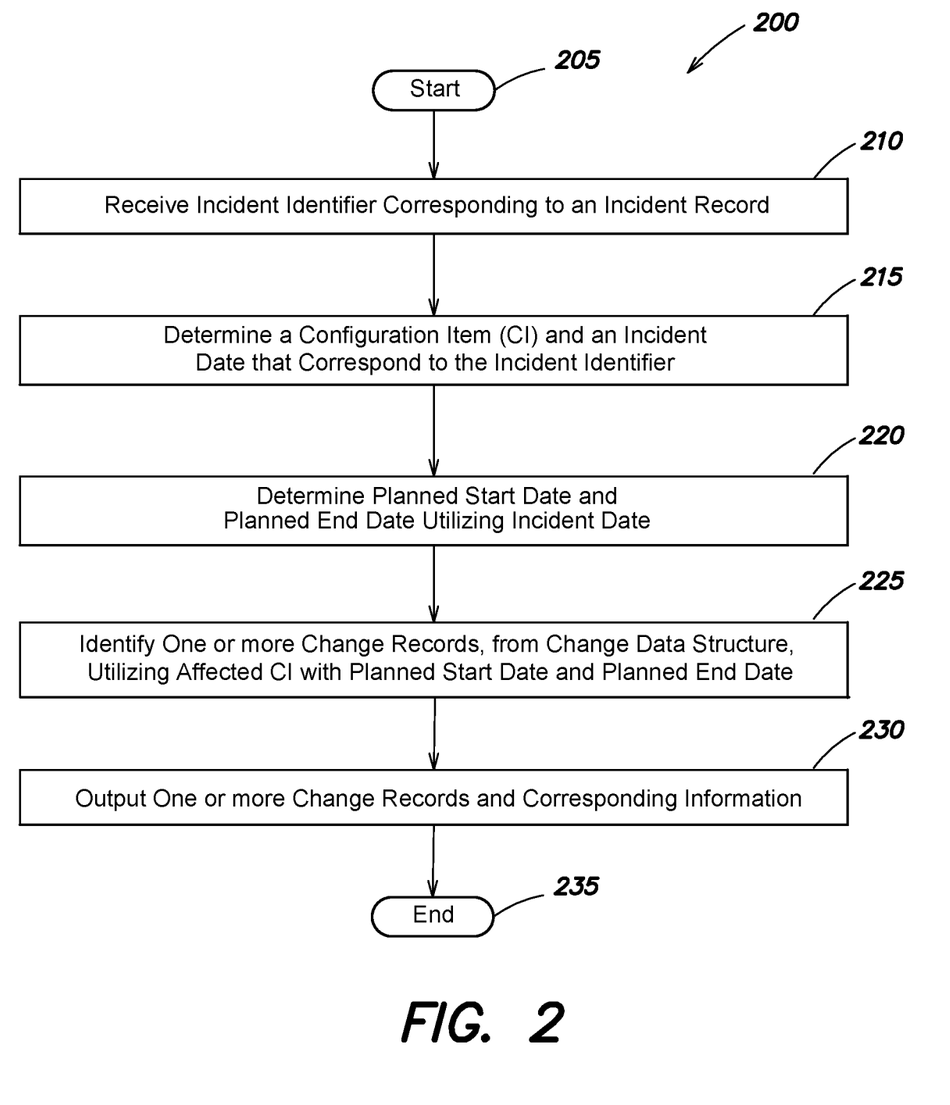
FIG. 2 is a flow diagram of a sequence of steps for correlating incident data to change data according to the one or more embodiments as described herein.

FIG. 2 is a flow diagram of a sequence of steps for correlating incident data to change data according to the one or more embodiments as described herein. In an embodiment, procedure 200 of FIG. 2 may be performed on-demand. For example, authorized personnel of the enterprise may utilize client device 110 to provide an input command such that the procedure 200 of FIG. 2 may be initiated and performed. Alternatively, procedure 200 of FIG. 2 may be performed at one or more predetermined times or on a predetermined schedule.

The procedure 200 starts at step 205 and continues to step 210 where the ITSM module 118 receives an incident identifier corresponding to an incident record. In an embodiment, the incident identifier is an alphanumeric value that uniquely identifies an incident record (i.e., incident ticket) in the incident data structure 124. The incident record may correspond to an incident encountered by the infrastructure environment that affected a CI. IT personnel may utilize client device 110 to provide the incident identifier corresponding to the incident record to the ITSM module 118. The incident record may be created and added to the incident data structure 124 in response to a user (e.g., customer of enterprise system 126, employee of enterprise system 126, etc.) encountering an incident when interacting with the enterprise system 126.

For example, a software component (e.g., a CI) executing on enterprise system 126 may crash when the user tries to implement a particular function. Based on the crashing of the software component, an incident ticket may be generated, and the incident ticket may have a unique incident identifier that differentiates the incident ticket from all other incident tickets. The incident ticket and its corresponding information may be stored in an entry, e.g., row, of the incident data structure 124. A row of the incident data structure 124 with its corresponding information may be referred to as an incident record. For this example, let it be assumed that the incident number is "1234" and the name of the software component that crashes is "Alpha App." In an embodiment, the incident corresponding to the incident record may be referred to as an incident of interest.

The procedure continues to step 215 and the ITSM module 118 determines a configuration item (CI) and an incident date that correspond to the incident identifier. In an embodiment, the ITSM module 118 may index into the incident data structure 124 to identify the CI and incident date. Specifically, the ITSM module 118 may identify an entry, e.g., row, of the incident data structure 124 that corresponds to the unique incident identifier. For this example, the ITSM module 118 may identify a row of the incident data structure 124 that has a row identifier of 1234, which is the incident identifier. The ITSM module 118 may identify an entry, e.g., column, from the identified row that stores a CI identifier for the CI that is associated with the incident. In this example, the ITSM module 118 identifies the entry, e.g., column, of row 1234 that stores the identifier of Alpha App. In an embodiment, the identified CI may be referred to as an affected CI or CI of interest.

The ITSM module 118 may also identify an entry, e.g., column, from row 1234 that stores an identifier for a date associated with the incident. In an embodiment, the incident date may correspond to the date on which the incident occurred and/or was opened as a ticket. In this example, the ITSM module 118 identifies a column that stores an incident date of Jan. 15, 2022. Therefore, and in this example, the incident number of 1234 corresponds to a particular incident (i.e., incident of interest) having information that is stored in a particular row of the incident data structure 124. The ITSM module 118 can then determine, from particular columns of the identified row, a CI (e.g., affected CI or CI of interest) corresponding to the incident and an incident date that may indicate the date on which the incident occurred and/or was opened.

The procedure continues to step 220 and the ITSM module 118 determines a planned start date and a planned end date utilizing the incident date. A planned start date and a planned end date may be two parameters that are typically associated with a change that is made to an infrastructure environment and that is stored as a change record in the change data structure 127. The planned start date may indicate the date on which a particular change to the infrastructure environment is planned to be implemented. The planned end date may indicate the date on which the particular change is planned to be completed. In an embodiment, the ITSM module 118 may determine the planned start date by subtracting a predefined time value from the incident date. In an embodiment, the predefined time value is 6 days. Alternatively, the predefined time value may be any value in terms of days, hours, weeks, etc. The ITSM module 118 may determine that the planned end date is equal to the incident date.

In this example, let it be assumed that the predefined time value is 6 days. As such, the ITSM module 118 determines that the planned start date is Jan. 9, 2022 (e.g., Jan. 15, 2022, minus 6 days). Further, the ITSM module 118 determines that the planned end date is Jan. 15, 2022.

The procedure continues to step 225 and the ITSM module 118 identifies one or more change records, from change data structure 127, utilizing the affected CI with the planned start date and the planned end date. In an embodiment, the ITSM module 118 may utilize the affected CI with the planned start date and planned end date as a filter to identify one or more change records. For example, each row of the change data structure 127 may correspond to a different planned change or change made to the infrastructure environment. Each row that corresponds to a change may store information for the change. For example, information for a change may be stored in a same row but different columns of the change data structure 127.

Such information may include, but is not limited to, a unique change identifier identifying the change (e.g., change record), an identifier indicating a type of the change, a planned start date for the change, a planned end date for the change, one or more CIs that are or will be affected by the change, a short description describing the change, a detailed description describing the change in detail, and an assignment group identifying one or more users of enterprise system 126 that are responsible for the change.

For this example, The ITSM module 118 may identify each row of the change data structure 127 that (1) has a planned start date that is on or after Jan. 9, 2022, (2) has a planned end date that is on or before Jan. 15, 2022, and (3) indicates that an affected CI (i.e., CI of interest) is Alpha App. Therefore, the one or more identified change records correspond to those changes made to the infrastructure environment that occurred in a recent particular time frame (e.g., last 7 days) and that affected a CI of interest.

As such, and according to the one or more embodiments as described herein, incident data (e.g., incident identifier, determined CI, and incident date) from incident data structure 124 is linked and correlated to change data (e.g., change records) of the change data structure 127. Based on the correlation, the one or more embodiments as described herein can identify the most recent and relevant infrastructure environment changes that affected the CI of interest and, thus, were most likely to cause the incident of interest, e.g., reported incident.

By automatically identifying the most recent and relevant infrastructure environment changes, the one or more embodiments as described herein provide a technique for efficiently identifying one or more causes of the incident to remediate the incident. As such, the one or more embodiments as described herein provide an improvement in the existing technological field of information technology service management.

The procedure continues to step 230 and the ITSM module 118 outputs the one or more change records and corresponding information. For example, the ITSM module 118 may display the one or more change records and corresponding information on a display screen of client device 110 being operated by IT service personnel. In an embodiment, the corresponding information displayed with each change record includes a change identifier, a change type, a planned start date, a planned end date, a short description, and an assignment group. The IT service personnel may evaluate the one or more change records to determine which of the identified changes may have caused the incident corresponding to the incident identifier. The IT service personnel may then roll back a particular change, i.e., undo a change, to improve or remediate the incident. Procedure 200 ends at step 235.

One or more of the identified change records may also be utilized, according to the one or more embodiments as described herein, to automatically identify one or more problem records from problem data structure 128. That is, and as will be described in further detail below with relation to FIG. 3, change information (e.g., a change identifier) from an identified change record can be linked to and correlated to a problem record of the problem data structure 128. Root cause information from the problem record can then be utilized to remediate the incident of interest that corresponds to the incident identifier, e.g., received at step 210 of FIG. 2, as will be described in further detail below.

Figure 3:
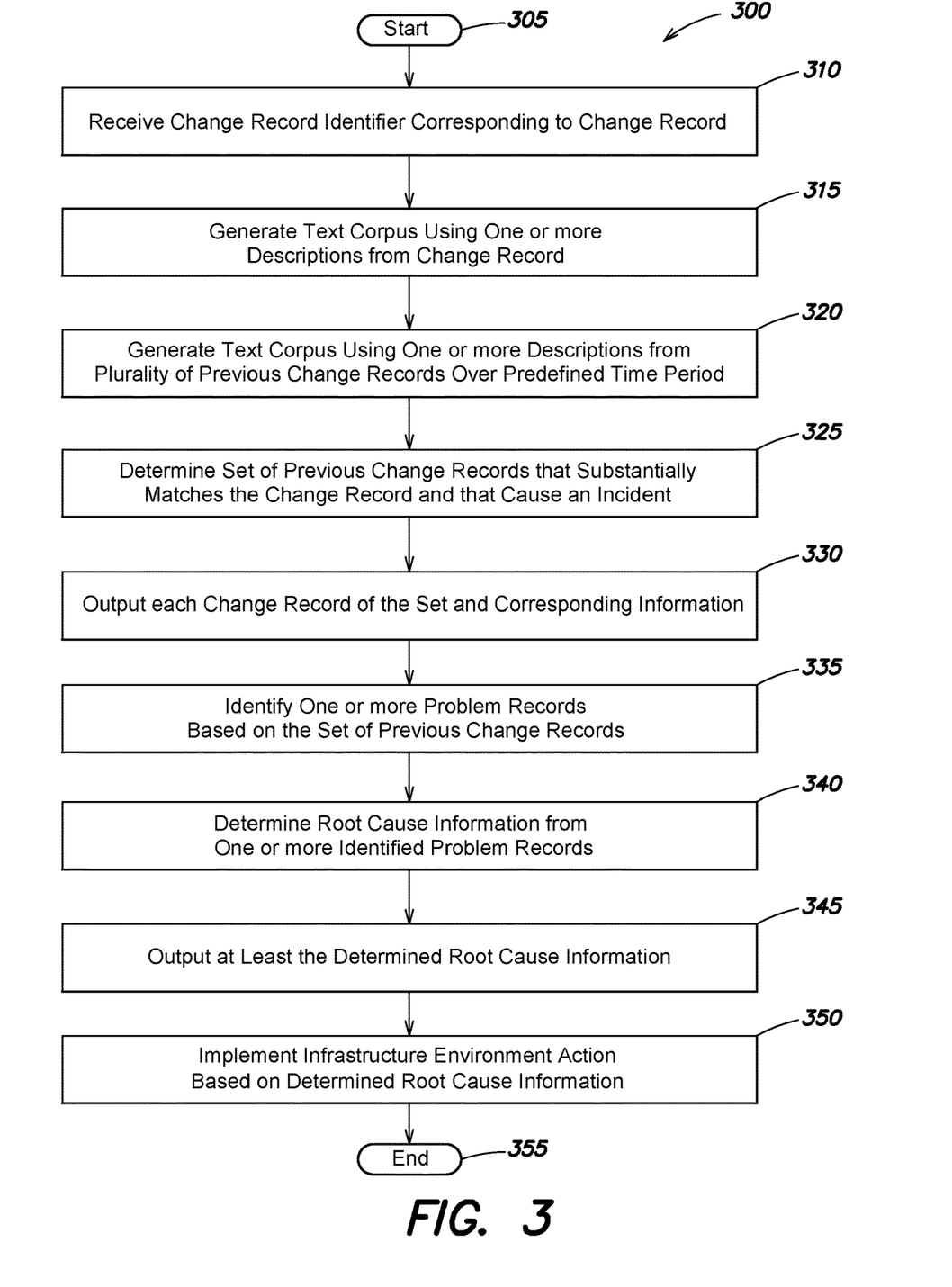
FIG. 3 is a flow diagram of a sequence of steps for correlating change data to problem data for change remediation according to the one or more embodiments as described herein.

FIG. 3 is a flow diagram of a sequence of steps for correlating change data to problem data for change remediation according to the one or more embodiments as described herein. In an embodiment, procedure 300 of FIG. 3 may be performed on-demand. For example, authorized personnel of the enterprise may utilize client device 110 to provide an input command such that the procedure 300 of FIG. 3 may be initiated and performed. Alternatively, procedure 300 of FIG. 3 may be performed at one or more predetermined times or on a predetermined schedule.

The procedure 300 starts at step 305 and continues to step 310 where the ITSM module 118 receives a change identifier corresponding to a change record. In an embodiment, the change identifier is an alphanumeric value that uniquely identifies a change record in the change data structure 127. In an embodiment, IT personnel may utilize client device 110 to provide the change identifier to the ITSM module 118. For example, the change identifier may correspond to a change identified at step 225.

As explained above, the one or more change records identified at step 225 of FIG. 2 are the most recent and relevant infrastructure environment changes that affected the CI of interest and, thus, may have caused the reported incident (i.e., incident of interest). By using the change identifier of a change identified in step 225, the one or more embodiments as described herein can identify a problem record that is linked to the change identifier as will be described in further detail below. Instead of using a change identifier corresponding to a change identified at step 225, a change identifier for any other change record may be received by the ITSM module 118 at step 310.

The procedure continues to step 315 and the ITSM module 118 generates a text corpus using one or more descriptions from the change record. For simplicity and ease of understanding, the text corpus generated at step 315 is referred to as the "first text corpus". The use of "first" in "first text corpus" is not meant to indicate a temporal or ordering relationship with respect to the other text corpuses as described herein. Instead, "first text corpus" is used herein to more readily differentiate the text corpus generated at step 315 from the text corpus generated at step 320 and the text corpuses generated in relation to FIG. 5.

In an embodiment, the ITSM module 118 utilizes the change identifier to identify an entry, e.g., row, of the change data structure 127. The identified row may be the change record that corresponds to the change identifier. The ITSM module 118 may obtain, from the identified row, the short description and the detailed description for the change record. The ITSM module 118 may concatenate the short description and detailed description of the change record to generate the first text corpus.

The procedure continues to step 320 and the ITSM module 118 generates a text corpus using one or more descriptions from a plurality of previous change records obtained over a predefined time period. For simplicity and ease of understanding, the text corpus generated at step 320 is referred to as the "second text corpus". The use of "second" in "second text corpus" is not used to indicate a temporal or ordering relationship with respect to the other text corpuses as described herein. Instead, "second text corpus" is used herein to more readily differentiate the text corpus generated at step 320 from the text corpus generated at step 315 and the text corpuses generated in relation to FIG. 5.

In an embodiment, the plurality of previous change records obtained over the predefined time period are only those change records that correspond to infrastructure environment changes that have not been cancelled or have not been denied. To generate the second text corpus, the ITSM module 118 may concatenate the short and detailed description of each previous change record over the predefined time period, and utilize a token or identifier to separate each concatenation within the second text corpus. In an embodiment, each concatenation of the second text corpus may have corresponding metadata that includes the change identifier that corresponds to a concatenation.

In an embodiment, the predefined time period is a previous number of rolling months. The number of previous rolling months may be the past rolling 13 months. In an embodiment, the second text corpus may be updated daily. For example, the second text corpus may be generated automatically and daily at a particular time as a background task/process. Further, the second text corpus may be generated as a file. In an embodiment, the file may be a byte stream that is generated based on serialization of the one or more descriptions from the plurality of previous change records.

The procedure continues to step 325 and the ITSM module 118 determines a set of previous change records that substantially matches the change record and that cause an incident. In an embodiment, the ITSM module 118 provides the two text corpuses as input to a natural language processing (NLP) model to identify the set of previous change records that substantially match the change record. In an embodiment, the NLP model is a pretrained sentence-bidirectional Encoder Representations from Transformers (BERT) model.

The sentence-BERT model may take the two text corpuses as input and generate a plurality of similarity scores. Each similarity score may represent the degree of similarity between the concatenated description of the change record and each concatenated description for each previous change record over the predefined time period. In an embodiment, a particular similarity score may represent the semantic similarity between the concatenated description of the change record and the concatenated description of a particular previous change record. The sentence-BERT model may utilize a cosine similarity technique to determine each of the plurality of similarity scores.

In an embodiment, a predefined number of top similarity scores may be selected. For example, the ITSM module 118 may select the 5 top similarity scores. The ITSM module 118 may determine that the 5 previous change records corresponding to the top 5 similarity scores are the set of previous change records. As the previous change records in the set have the top similarity scores, the previous change records in the set are determined to be the most similar to the change record. Therefore, the set of previous change records may be referred to as a set of most similar previous change records.

In an embodiment, a previous change record is only included in the set if a previous change, corresponding to the previous change record, caused an incident. The ITSM module 118 may determine if the previous change causes an incident by accessing and analyzing the incident data structure 124. In an embodiment, an incident record, e.g., row of incident data structure 124, may store in a particular entry, e.g., column, a change identifier when an infrastructure environment change is linked to an incident. Therefore, the ITSM module 118 may determine if a previous change of the set causes an incident by accessing the incident data structure 124 and determining if any row has a corresponding column that stores the change identifier of the previous change.

If so, the ITSM module 118 determines that the previous change causes an incident, and the previous change record is maintained in the set. If not, the ITSM module 118 determines that the previous change does not cause an incident, and the previous change record is removed from the set. The ITSM module 118 may then select a different previous change record with a next highest score to be included in the set. The ITSM module 118 may determine if the different previous change record corresponds to a different previous change that caused an incident in a similar manner as described above. The ITSM module 118 may repeat this process until it is determined that each previous change record in the set has a top 5 similarity scores and caused an incident.

The procedure continues to step 330 and the ITSM module 118 outputs the set of previous change records (i.e., the set of most similar previous change records) and corresponding information. For example, the ITSM module 118 may display the one or more previous change records and corresponding information on a display screen of client device 110 being operated by IT service personnel. The corresponding information may include, but is not limited to, a unique change number identifying the change (e.g., change record), an identifier indicating a type of the change, a planned start date for the change, a planned end date for the change, one or more CIs that are or will be affected by the change, a short description describing the change, a detailed description describing the change in detail, and an assignment group identifying one or more users of enterprise system 126 that are responsible for the change.

The procedure continues to step 335 and the ITSM module 118 identifies one or more problem records based on the set of previous change records. In an embodiment, a problem record of problem data structure 128 may be linked to an incident. Specifically, a problem record corresponding to a problem may include an incident identifier of an incident when it is determined that the problem caused the incident.

For example, let it be assumed that a software bug results in Alpha app crashing for three different users. In this example, the crashing for the three different users may correspond to three different incidents that are included in the incident data structure 124. For example, the three different incidents may have incident identifiers A1, A2, and A3, respectively.

Further, and in this example, the problem is the software bug. The problem of the software bug may be included in a problem record of the problem data structure 128. In this example, let it be assumed that the problem identifier for the problem is AABB. Because the software bug causes the crashing of Alpha App for each of the three different users, problem record AABB (e.g., a row of problem data structure 128) may store incident identifiers A1, A2, and A3.

As such, a problem record may be linked to one or more incidents. Further, and as explained above with relation to step 325 of FIG. 3, each previous change record in the set is determined to cause an incident based on the change identifier being included in an incident record. Therefore, the ITSM module 118 may utilize the incident identifiers, for the incidents that are linked to each of the previous change records in the set, to identify one or more problem records from problem data structure 128. Specifically, the ITSM module 118 may index into the problem data structure 128 utilizing a particular incident identifier to determine if the particular incident identifier is included in the problem data structure 128.

If so, the ITSM module 118 may identify the entry, e.g., row, of the problem data structure 128 that includes the particular incident identifier. The entry, e.g., row, may correspond to a particular problem record for the problem that caused the particular incident. For example, let it be assumed that a previous change record in the set is linked to an incident identifier of A2, e.g., a previous change corresponding to a previous change record in the set caused an incident that corresponds to incident identifier A2. As such, the ITSM module 118 may determine that incident identifier A2 is included in the problem record that is identified by problem identifier AABB. Therefore, and in this example, problem record AABB is identified based on the set of previous change records. Thus, the ITSM module 118 may identify a problem record for each of the previous change record in the set in a similar manner.

The procedure continues to step 340 and the ITSM module 118 determines root cause information from the one or more identified problem records. In an embodiment, a problem record, e.g., row in the problem data structure 128, may include root cause information that indicates the root cause of a problem. For the example referenced in FIG. 3, problem record AABB may store root cause information indicating that the cause of the software bug, that resulted in Alpha App in crashing, was a software update to Alpha App on Jan. 10, 2022. Therefore, and in this example, the ITSM module 118 may access problem record AABB and identify the root cause information indicating that the software bug was caused by the software update.

The procedure continues to step 345 and the ITSM module outputs at least the determined root cause information. For example, the ITSM module 118 may display the determined root cause information on a display screen of client device 110 being operated by IT service personnel. In an embodiment, additional information may be displayed with the root cause information. Such information may include, but is not limited to, known errors associated with the problem, a code corresponding to the root cause, assignment group for users responsible for the problem, etc.

The procedure continues to step 350 and the ITSM module 118 implements an infrastructure environment action based on the determined root cause information. For the example of FIG. 3, the root cause information indicates that the software bug was caused by the software update to Alpha app on Jan. 10, 2022. Based on this root cause information, the ITSM module 118 may block any other similar software updates from being applied or implemented to the Alpha app executing on client devices of other users who have not yet implemented the software update and thus have not experienced a related incident. Procedure 300 then ends at step 355.

Therefore, an incident of interest that affects a CI can be received by the ITSM module 118 to identify a recent infrastructure environment change that affected the CI as described in relation to FIG. 2. The ITSM module 118 may identify other previous infrastructure environment changes that are substantially similar, e.g., semantically similar, and that cause an incident as described in relation to FIG. 3. The ITSM module 118 may then identify problems that are linked to the previous infrastructure environment changes based on the incidents caused by the previous infrastructure environment changes. The identified problem may be a relevant problem that can be leveraged to improve or remediate the incident of interest that corresponds to the incident identifier received at step 210.

For example, and by implementing a blocking action, or any similar type of infrastructure environment action, the one or more embodiments as described herein improves IT services since less infrastructure environment incidents are experienced. As such, the one or more embodiments as described herein provide an improvement in the existing technological field of information technology service management. Further, because the infrastructure environment action results in better IT service performance on the client device 110, e.g., application crashes less on client device 110, the one or more embodiments as described herein provide an improvement to the computer, e.g., client device 110, itself.

In addition to identifying root cause information to improve or remediate an infrastructure environment incident as described in relation to FIGS. 2 and 3, the one or more embodiments as described herein may also identify the incidents, and their associated problems, that correspond to an affected CI that is linked to an incident of interest. Specifically, and as will be described in further detail below in relation to FIG. 4, the ITSM module 118 may utilize the CI identifier from the incident of interest to identify previous incidents related to the affected CI over a predefined time period, e.g., past 60 hours from an incident date. That is, incident data may be correlated to other incident data as will be described in further detail with respect to FIG. 4.

As will be described in further detail below in relation to FIG. 5, the ITSM module 118 may determine which other recent incidents substantially match a previous incident, and then identify the problems corresponding to the other recent incidents. That is, incident data may be correlated to problem data as will be described in further detail below with respect to FIG. 5. The identified problems then can be utilized to improve or remediate the incident of interest.

Figure 4:
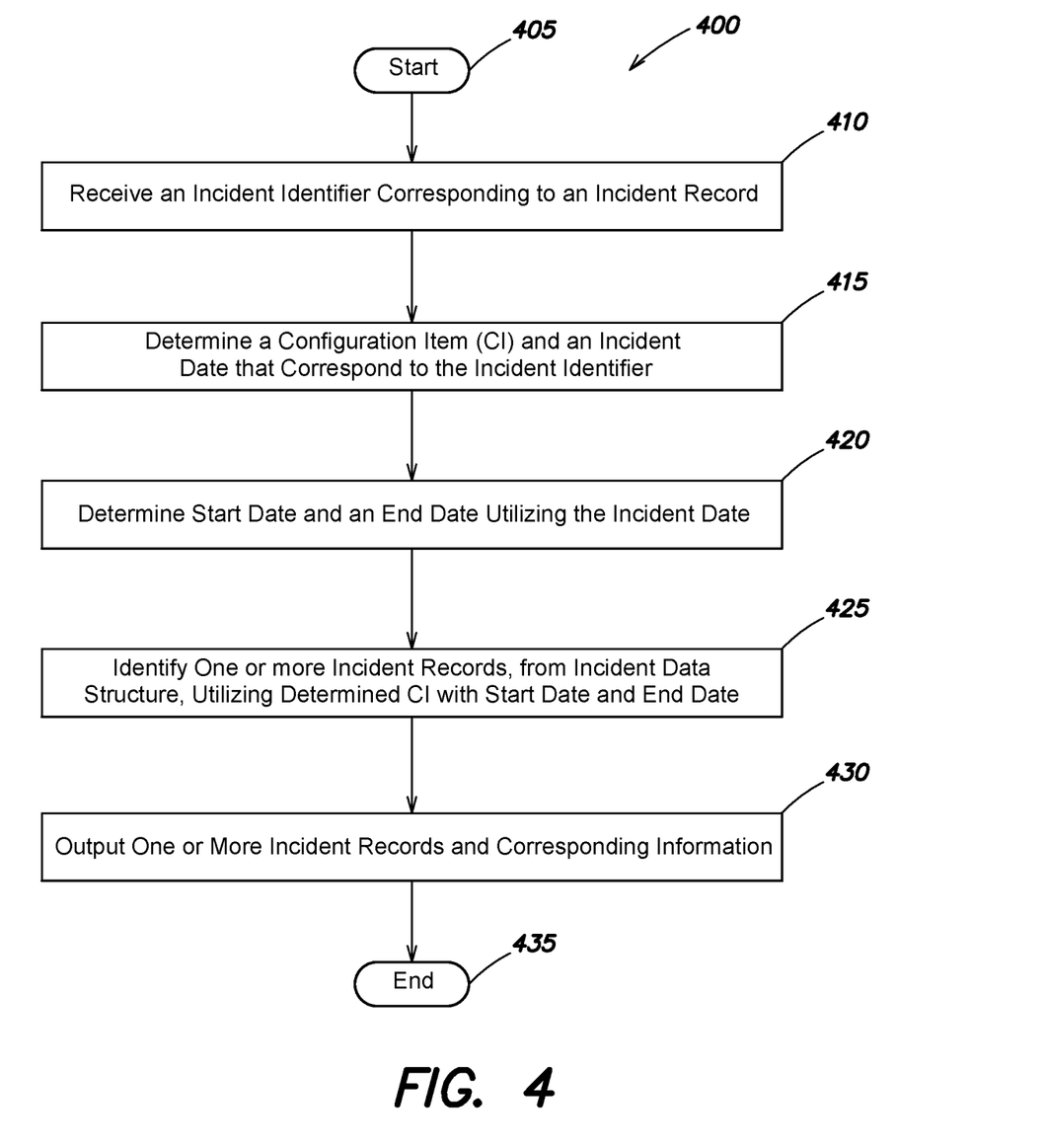
FIG. 4 is a flow diagram of a sequence of steps for correlating incident data to other incident data according to the one or more embodiments as described herein.

FIG. 4 is a flow diagram of a sequence of steps for correlating incident data to other incident data according to the one or more embodiments as described herein. In an embodiment, procedure 400 of FIG. 4 may be performed on-demand. For example, authorized personnel of the enterprise may utilize client device 110 to provide an input command such that the procedure 400 of FIG. 4 may be initiated and performed. Alternatively, procedure 400 of FIG. 4 may be performed at one or more predetermined times or on a predetermined schedule.

The procedure 400 starts at step 405 and continues to step 410 where the ITSM module 118 receives an incident identifier corresponding to an incident record, i.e., an incident of interest. The ITSM module 118 may receive the incident identifier in a similar manner as described above with reference to step 210 of FIG. 2.

The procedure continues to step 415 and the ITSM module 118 uses the incident identifier to determine a configuration item (CI) and an incident date that correspond to the incident identifier. The ITSM module 118 may determine the CI and the incident date in a similar manner as described above with reference to step 215 of FIG. 2. For this example, let it be assumed that the determined CI is Beta App that crashes and the incident date is Jan. 10, 2022 at 12:00 PM.

The procedure continues to step 420 and the ITSM module 118 determines a planned start date and a planned end date utilizing the incident date. A start date and an end date may be two parameters that are typically associated with each incident that occurs to an infrastructure environment and that is stored in an incident record of the incident data structure 124. The start date may indicate the date on which a particular incident to the infrastructure environment occurred and was reported. The end date may indicate the date on which the particular incident ended.

In an embodiment, the ITSM module 118 may determine the start date by subtracting a predefined time value from the incident date. In an embodiment, the predefined time value is 60 hours. Alternatively, the predefined time value may be any value in terms of days, hours, weeks, etc. The ITSM module 118 may determine that the end date is equal to the incident date.

In this example, let it be assumed that the predefined time value is 60 days. As such, the ITSM module 118 determines that the planned start date is Jan. 8, 2022, at 12:00 AM (e.g., Jan. 10, 2022, at 12:00 PM minus 60 hours). Further, the ITSM module 118 determines that the planned end date is Jan. 10, 2022, at 12:00 PM.

The procedure continues to step 425 and the ITSM module 118 identifies one or more incident records, from incident data structure 124, utilizing the affected CI with the start date and the end date. In an embodiment, the ITSM module 118 may utilize the affected CI with the start date and end date as a filter to identify one or more incident records. For example, each row of the incident data structure 124 may correspond to a different incident that occurred to the infrastructure environment. Each row that corresponds to an incident may store information for the incident. For example, information for an incident may be stored in a same row but different columns of the change data structure 124.

For this example, The ITSM module 118 may identify each row of the incident data structure 124 that (1) has a start date that is on or after Jan. 8, 2022, at 12:00 AM (2) has an end date that is on or before Jan. 10, 2022, at 12:00 PM, and (3) indicates that an affected CI is Beta App. Therefore, the one or more identified incident records correspond to those incidents that were encountered by the infrastructure environment in a recent particular time frame (e.g., last 60 hours) and that affect a particular CI. In an embodiment, the one or more identified incident records may be referred to as previous incident records since the incidents occurred before the incident corresponding to the incident identifier received at step 410.

As such, and according to the one or more embodiments as described herein, incident data (e.g., incident identifier, determined CI, and incident date) from incident data structure 124 can be linked to and correlated to different incident data (e.g., incident records) of the incident data structure 124. Based on the correlation, the one or more embodiments as described herein can identify the most recent and relevant previous infrastructure environment incidents that affected the CI of interest and, thus, are most related to the incident of interest that is associated with the incident identifier received at step 410.

The most recent and relevant previous infrastructure environment incidents may be referred to as symptoms that were encountered by the infrastructure environment and that are related to the CI of interest. If the symptoms, e.g., previous incidents that affected the CI of interest, are similar to the characteristics of the incident corresponding to the incident identifier received at step 410, resolution information corresponding to the previous incident records may be utilized to address and remediate the incident. As such, the one or more embodiments as described herein provide an improvement in the existing technological field of information technology service management.

The procedure continues to step 430 and the ITSM module 118 outputs the one or more incident records and corresponding information. For example, the ITSM module 118 may display the one or more incident records, i.e., previous incident records, and corresponding information on a display screen of client device 110 being operated by IT service personnel. In an embodiment, the corresponding information displayed with each incident record includes a change identifier, an incident opened date indicating the date on which the previous incident was recorded, an impact field indicating the impact the incident has on the infrastructure environment, an urgency field indicating the urgency, e.g., low, moderate, high, for resolving the incident, a short description describing the incident, and an assignment group indicating the users responsible for the incident. Procedure 400 ends at step 435.

As will be described in further detail below with reference to FIG. 5, incident data may be correlated to problem data that may be utilized to improve or remediate the incident corresponding to the incident identifier received at step 410.

Figure 5:
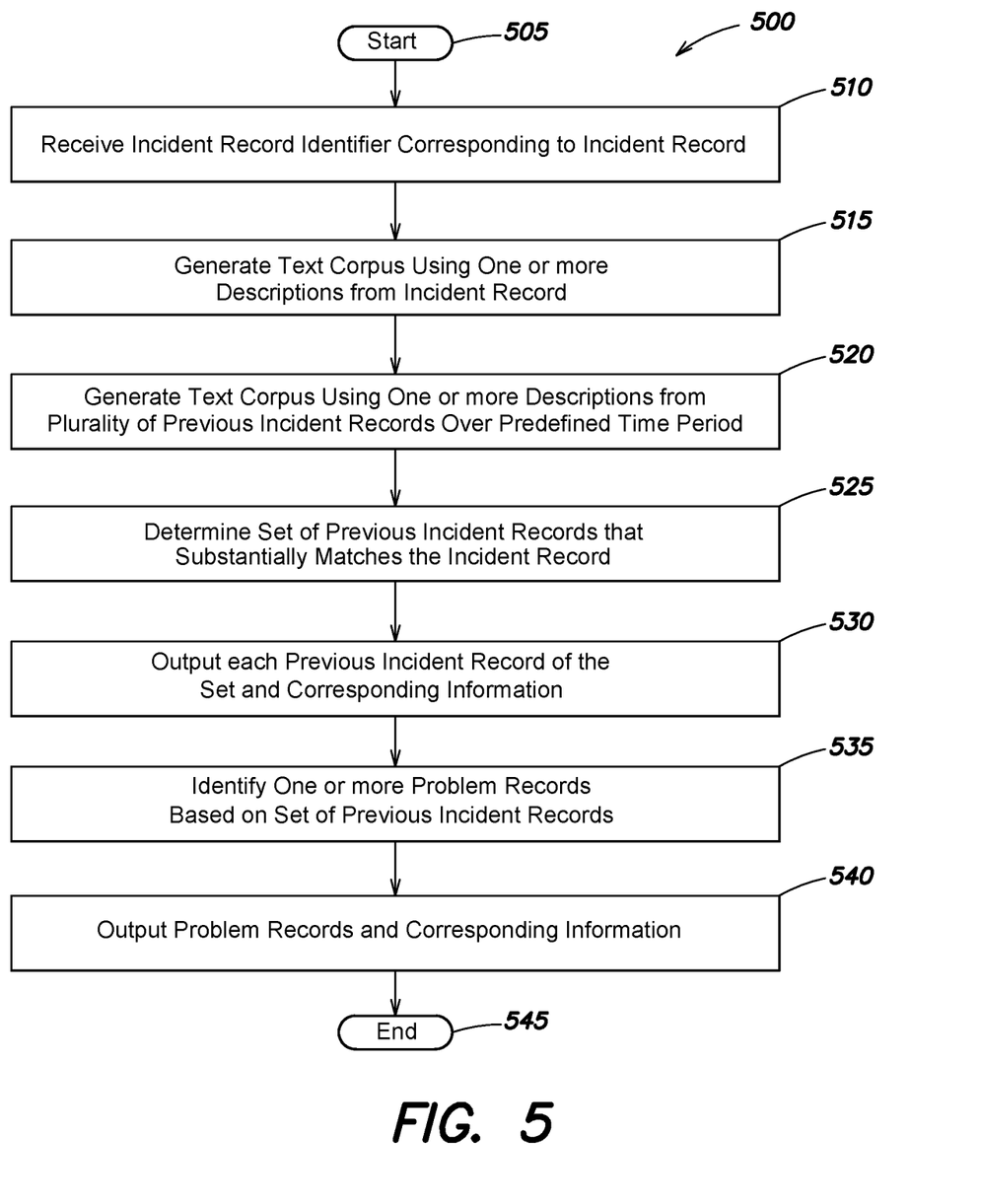
FIG. 5 is a flow diagram of a sequence of steps for correlating incident data to problem data for identifying related incidents and their corresponding problems according to the one or more embodiments as described herein.

FIG. 5 is a flow diagram of a sequence of steps for correlating incident data to problem data for identifying related incidents and their corresponding problems according to the one or more embodiments as described herein. In an embodiment, procedure 500 of FIG. 5 may be performed on-demand. For example, authorized personnel of the enterprise may utilize client device 110 to provide an input command such that the procedure 500 of FIG. 5 may be initiated and performed. Alternatively, procedure 500 of FIG. 5 may be performed at one or more predetermined times or on a predetermined schedule.

The procedure 500 starts at step 505 and continues to step 510 where the ITSM module 118 receives an incident identifier corresponding to an incident record of an incident encountered by the infrastructure environment. The incident may be referred to as an incident of interest. In an embodiment, the incident identifier is an alphanumeric value that uniquely identifies an incident record in the incident data structure 124. In an embodiment, IT personnel may utilize client device 110 to provide the incident identifier to the ITSM module 118.

As explained above, the one or more previous incident records identified at step 425 are the most recent and relevant infrastructure environment incidents that affected the CI of interest. As such, the incident identifier may correspond to a previous incident identified at step 425. Instead of using an incident identifier corresponding to a previous incident identified at step 425, an incident identifier for any other incident record may be received by the ITSM module 118 at step 510.

The procedure continues to step 515 and the ITSM module 118 generates a text corpus using one or more descriptions from the incident record. For simplicity and ease of understanding, the text corpus generated at step 515 is referred to as the "third text corpus". The use of "third" in "third text corpus" is not meant to indicate a temporal or ordering relationship with respect to the other text corpuses as described herein. Instead, "third text corpus" is used herein to more readily differentiate the text corpus generated at step 515 from the text corpus generated at step 520 and the text corpuses generated in relation to FIG. 3. The ITSM module 118 may generate the third text corpus, utilizing the incident data structure 124, in a similar manner as described above with reference to step 315 of FIG. 3.

The procedure continues to step 520 and the ITSM module 118 generates a text corpus using one or more descriptions from a plurality of previous incident records obtained over a predefined time period. For simplicity and ease of understanding, the text corpus generated at step 520 is referred to as the "fourth text corpus". The use of "fourth" in "fourth text corpus" is not used to indicate a temporal or ordering relationship with respect to the other text corpuses as described herein. Instead, "fourth text corpus" is used herein to more readily differentiate the text corpus generated at step 520 from the text corpus generated at step 515 and the text corpuses generated in relation to FIG. 3. The ITSM module 118 may generate the fourth text corpus, utilizing the incident data structure 124, in a similar manner as described above with reference to step 320 of FIG. 3.

The procedure continues to step 525 and the ITSM module 118 determines a set of the previous incident records that substantially matches the incident record. In a similar manner as described above in relation to step 325 of FIG. 3, the ITSM module 118 provides the two text corpuses as input to an NLP model, e.g., sentence-BERT model, to identify the set of previous incident records that substantially match the previous incident record corresponding to the incident identifier received at step 510.

The sentence-BERT model may take the two text corpuses (e.g., third text corpus and fourth text corpus) as input and generate a plurality of similarity scores. Each similarity score may represent the degree of similarity between the concatenated description of the incident record and each concatenated description for each previous incident record over the predefined time period. In an embodiment, a particular similarity score may represent the semantic similarity between the concatenated description of the incident record and the concatenated description of a particular previous incident record. The sentence-BERT model may utilize a cosine similarity technique to determine each of the plurality of similarity scores.

In an embodiment, the ITSM module 118 may identify those previous incident records, corresponding to the fourth text corpus, that have a cosine similarity score of at least 60%. The ITSM module may select a predefined number (e.g., 5) of those previous incident record that have a cosine similarity score of at least 60%. The predefined number (e.g., 5) of selected previous incident records that have a cosine similarity score of at least 60% may be the set of previous incident records.

The procedure continues to step 530 and the ITSM module 118 outputs the set of previous incident records and corresponding information. For example, the ITSM module 118 may display the set of previous incident records and corresponding information on a display screen of client device 110 being operated by IT service personnel. In an embodiment, the corresponding information displayed with each previous incident record includes a change identifier, an incident opened date indicating the date on which the previous incident was recorded, an impact field indicating the impact the incident has on the infrastructure environment, an urgency field indicating the urgency, e.g., low, moderate, high, for resolving the incident, a short description describing the incident, and an assignment group indicating the users responsible for the incident.

The procedure continues to step 535 and the ITSM module 118 identifies one or more problem records based on the set of previous incident records. As described above with relation to step 335 of FIG. 3, a problem record of problem data structure 128 may be linked to an incident. Specifically, a problem record for a problem may include an incident identifier of an incident when it is determined that the problem caused the incident. Therefore, the ITSM module 118 may utilize the incident identifier, for each incident in the set of previous incident records, to identify one or more problem records from problem data structure 128 in a similar manner as described above with reference to step 335 of FIG. 3.

The procedure continues to 540 and the ITSM module 118 outputs the one or more identified problem records and corresponding information. In an embodiment, such corresponding information may include, but is not limited to, a problem identifier corresponding to a particular problem record, an incident identifier corresponding to the incident identifier utilized to identify the particular problem record, a CI identifier identifying a CI that is associated with the particular problem record, an assignment group identifying one or more users that are responsible for the problem record, and a short description describing the problem corresponding to the particular problem record.

An identified problem may be used to improve or remediate the incident of interest corresponding to the incident identifier received at step 410. Specifically, the identified problem is known to cause an incident, e.g., previous incident, since the problem record for the identified problem includes an incident identifier for the previous incident. Further, the previous incident is linked to the incident of interest based on the procedure of FIG. 4 and as determined at step 525 of FIG. 5.

As such, the identified problem may be applicable or relevant to the incident of interest. Therefore, and by identifying the problem to improve or remediate the incident of interest, the one or more embodiments as described herein provide an improvement in the existing technological field of information technology management services. The procedure then ends at step 545.

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer-implemented method for performing information technology service management (ITSM) correlation, the method comprising:

receiving, by a processor of a computing device, an incident identifier corresponding to an incident that causes (1) an interruption to an information technology service provided by an infrastructure environment, (2) a reduction in quality of the information technology service, or (3) change risk assessment on the information technology service;

determining, by analysis of an incident data structure by the processor, a configuration item of the infrastructure environment that corresponds to the incident identifier;

determining, by analysis of the incident data structure by the processor, an incident date that corresponds to the incident identifier and indicates a date on which the incident was reported;

determining a planned start date by subtracting a first predefined time value from the incident date, wherein a planned end date is equal to the incident date;

identifying, by the processor, one or more change records from a change data structure, wherein each of the one or more change records indicates a particular change to the configuration item that occurred between the planned start date and the planned end date;

generating a first text corpus utilizing one or more first descriptions from a selected change record of the one or more change records;

generating a second text corpus utilizing one or more second descriptions from a plurality of previous change records obtained over a first predefined time period;

providing the first text corpus and the second text corpus as input to a pretrained natural language processing (NLP) model to identify a set of previous change records, of the plurality of previous change records, that substantially match the selected change record, wherein each previous change record from the set of previous change records corresponds to a particular infrastructure change that causes a particular incident; and identifying, from a problem data structure, one or more first problem records that each identify at least one previous change record from the set of previous change records, wherein each of the one or more first problem records describes a first particular problem encountered by the infrastructure environment.

2. The computer-implemented method of claim 1, further comprising:

identifying, from the one or more first problem records, at least one root cause description;

analyzing the at least one root cause description to determine one or more selected infrastructure changes; and automatically implementing the one or more selected infrastructure changes to the infrastructure environment based on the analysis or blocking the one or more selected infrastructure changes from being implemented to the infrastructure environment based on the analysis.

3. The computer-implemented method of claim 1, further comprising:

displaying each previous change record in the set of previous change records, where each previous change record in the set of previous change records includes a change identifier for an identified change to the infrastructure environment, a type of the identified change, a change planned start date indicating a particular planned start date for the identified change, a change planned end date indicating a particular planned end date for the identified change, a change description that describes the identified change, and an assignment group that identifies one or more users responsible for the identified change.

4. The computer-implemented method of claim 1, wherein the first predefined time value is six days and the first predefined time period is a thirteen month rolling period, and wherein the set of previous change records is five previous change records, of the plurality of previous change records, that each have a similarity score of at least 60 percent with the selected change record.

5. The computer-implemented method of claim 1, further comprising:

determining an incident start date by subtracting a second predefined time value from the incident date, wherein an incident end date is equal to the incident date;

identifying, by the processor, one or more selected incident records from the incident data structure, wherein each of the one or more selected incident records identifies a particular incident related to the configuration item that occurred between the incident start date and the incident end date; and displaying, on a computer display, the one or more selected incident records.

6. The computer-implemented method of claim 5, wherein the second predefined time value is 60 hours.

7. The computer-implemented method of claim 6, further comprising:

receiving a selection of a first incident record from the one or more selected incident records;

generating a third text corpus utilizing one or more third descriptions from the first incident record;

generating a fourth text corpus utilizing one or more fourth descriptions from a plurality of previous incident records obtained over a second predefined time period;

providing the third text corpus and the fourth text corpus as input to the pretrained NLP model to identify a set of previous incident records, of the plurality of previous incident records, that are most semantically similar to the first incident record; and identifying, from the problem data structure, one or more second problem records that each identify at least one previous incident record from the set of previous incident records, wherein each of the one or more second problem records describes a second particular problem encountered by the infrastructure environment.

8. The computer-implemented method of claim 7, wherein the second predefined time period is a thirteen month rolling period, and wherein the set of previous incident records are five previous incident records that have a similarity score of at least 60 percent with the first incident record.

9. The computer-implemented method of claim 1, wherein the incident data structure is a first table and each row of the first table corresponds to a different reported incident relating to the infrastructure environment, the change data structure is a second table and each row of the second table corresponds to a different change made to the infrastructure environment, and the problem data structure is a third table and each row of the third table corresponds to a different reported problem relating to the infrastructure environment.

10. A system for performing information technology service management (ITSM) correlation, the system comprising:
a processor coupled to a memory, the processor configured to:
receive an incident identifier corresponding to an incident that causes (1) an interruption to an information technology service provided by an infrastructure environment, (2) a reduction in quality of the information technology service, or (3) change risk assessment on the information technology service;
determine, by analysis of an incident data structure, a configuration item of the infrastructure environment that corresponds to the incident identifier;
determine, by analysis of the incident data structure, an incident date that corresponds to the incident identifier and indicates a date on which the incident was reported;
determine a planned start date by subtracting a first predefined time value from the incident date, wherein a planned end date is equal to the incident date;
identify one or more change records from a change data structure, wherein each of the one or more change records indicates a particular change to the configuration item that occurred between the planned start date and the planned end date;
generate a first text corpus utilizing one or more first descriptions from a selected change record of the one or more change records;
generate a second text corpus utilizing one or more second descriptions from a plurality of previous change records obtained over a first predefined time period;
provide the first text corpus and the second text corpus as input to a pretrained natural language processing (NLP) model to identify a set of previous change records, of the plurality of previous change records, that substantially match the selected change record, wherein each previous change record from the set of previous change records corresponds to a particular infrastructure change that causes a particular incident; and
identify, from a problem data structure, one or more first problem records that each identify at least one previous change record from the set of previous change records, wherein each of the one or more first problem records describes a particular problem encountered by the infrastructure environment.

11. The system of claim 10, wherein the processor is further configured to:
identify, from the one or more first problem records, at least one root cause description;
analyze the at least one root cause description to determine one or more selected infrastructure changes; and
automatically implement the one or more selected infrastructure changes to the infrastructure environment based on the analysis or block the one or more selected infrastructure changes from being implemented to the infrastructure environment based on the analysis.

12. The system of claim 10, wherein the processor is further configured to:
display each previous change record in the set of previous change records,
where each previous change record in the set of previous change records includes a change identifier for an identified change to the infrastructure environment, a type of the identified change, a change planned start date indicating a particular planned start date for the identified change, a change planned end date indicating a particular planned end date for the identified change, a change description that describes the identified change, and an assignment group that identifies one or more users responsible for the identified change.

13. The system of claim 10, wherein the first predefined time value is six days and the first predefined time period is a thirteen month rolling period, and wherein the set of previous change records is five previous change records, of the plurality of previous change records, that each have a similarity score of at least 60 percent with the selected change record.

14. The system of claim 10, wherein the processor is further configured to:
determine an incident start date by subtracting a second predefined time value from the incident date, wherein an incident end date is equal to the incident date; and
identify one or more selected incident records from the incident data structure, wherein each of the one or more selected incident records identifies a particular incident related to the configuration item that occurred between the incident start date and the incident end date;
display, on a computer display, the one or more selected incident records.

15. The system of claim 14, wherein the second predefined time value is 60 hours.

16. The system of claim 15, wherein the processor is further configured to:
receive a selection of a first incident record from the one or more selected incident records;
generate a third text corpus utilizing one or more third descriptions from the first incident record;
generate a fourth text corpus utilizing one or more fourth descriptions from a plurality of previous incident records obtained over a second predefined time period;
provide the third text corpus and the fourth text corpus as input to the pretrained NLP model to identify a set of previous incident records, of the plurality of previous incident records, that are most semantically similar to the first incident record; and identify, from the problem data structure, one or more second problem records that each identify at least one previous incident record from the set of previous incident records, wherein each of the one or more second problem records describes a second particular problem encountered by the infrastructure environment.

17. The system of claim 16, wherein the second predefined time period is a thirteen month rolling period, and wherein the set of previous incident records are five previous incident records that have a similarity score of at least 60 percent with the first incident record.

18. The system of claim 10, wherein
the incident data structure is a first table and each row of the first table corresponds to a different reported incident relating to the infrastructure environment,
the change data structure is a second table and each row of the second table corresponds to a different change made to the infrastructure environment, and the problem data structure is a third table and each row of the third table corresponds to a different reported problem relating to the infrastructure environment.

19. A non-transitory computer readable medium having software encoded thereon, 2 the software when executed by one or more computing devices operable to: receive an incident identifier corresponding to an incident that causes (1) an interruption to an information technology service provided by an infrastructure environment, (2) a reduction in quality of the information technology service, or (3) change risk assessment on the information technology service; determine, by analysis of an incident data structure, a configuration item of the infrastructure environment that corresponds to the incident identifier; determine, by analysis of the incident data structure, an incident date that corresponds to the incident identifier and indicates a date on which the incident was reported; determine a start date by subtracting a predefined time value from the incident date, wherein an end date is equal to the incident date; identify one or more selected incident records from the incident data structure, wherein each of the one or more selected incident records identifies a particular incident related to the configuration item that occurred between the start date and the end date; receive a selection of a first incident record from the one or more selected incident records; generate a first text corpus utilizing one or more first descriptions from the first incident record; generate a second text corpus utilizing one or more second descriptions from a plurality of previous incident records obtained over a predefined time period; provide the first text corpus and the second text corpus as input to a pretrained natural language processing (NLP) model to identify a set of previous incident records, of the plurality of previous incident records, that substantially match the first incident record; and identify, from a problem data structure, one or more problem records that each identify at least one previous incident record from the set of previous incident records, wherein each of the one or more problem records describes a particular problem encountered by the infrastructure environment.

20. The non-transitory computer readable medium of claim 19, the software when executed by one or more computing devices further operable to:
    identify, from the one or more problem records, at least one root cause description;
    analyze the at least one root cause description to determine one or more selected infrastructure changes; and
    automatically implement the one or more selected infrastructure changes to the infrastructure environment based on the analysis or block the one or more selected infrastructure changes from be implemented to the infrastructure environment based on the analysis.

\* \* \* \* \*